United States Patent [19]
Vogl et al.

[11] 4,383,741
[45] May 17, 1983

[54] BINOCULAR NIGHT TELESCOPE

[75] Inventors: Georg Vogl, Saltsjöbaden; Bo Möller, Bromma; Michel Söderlindh, Stockholm, all of Sweden

[73] Assignee: Aktiebolaget Bofors, Bofors, Sweden

[21] Appl. No.: 228,839

[22] Filed: Jan. 27, 1981

[30] Foreign Application Priority Data

Feb. 7, 1980 [SE] Sweden .............................. 8000985

[51] Int. Cl.³ .................... G02B 23/12; G02B 23/02
[52] U.S. Cl. .................................. 350/538; 350/545; 350/557
[58] Field of Search ............. 350/35, 33, 31, 50, 350/51, 52, 53, 54, 19; 250/213 R, 213 VT

[56] References Cited

U.S. PATENT DOCUMENTS

| | | | |
|---|---|---|---|
| 3,155,832 | 11/1964 | Bouwers | 350/52 |
| 3,549,231 | 12/1970 | Scidmore et al. | 350/52 |
| 3,776,614 | 12/1973 | Kloots et al. | 350/35 |
| 4,266,848 | 5/1981 | Schlegel | 350/8 |

FOREIGN PATENT DOCUMENTS

| | | | |
|---|---|---|---|
| 719076 | 10/1965 | Canada | 350/35 |
| 1941110 | 2/1971 | Fed. Rep. of Germany | 350/35 |

OTHER PUBLICATIONS

Emsley, H. H., "Reflecting Prisms", *The Optician*, vol. 143, No. 3711, 1962, p. 566.

*Primary Examiner*—Jon W. Henry
*Attorney, Agent, or Firm*—Pollock, Vande Sande & Priddy

[57] ABSTRACT

The invention relates to a binocular night telescope of the type which comprises a large aperture objective (1), a light amplifier tube (2) for amplifying the image projected by said large aperture objective and a viewing microscope which comprises telescope objectives (9, 10) and oculars (11, 12) as well as a collimating objective (6) for focusing the amplified image at infinity for an observer. The viewing microscope also comprises prisms or mirrors for erecting the image vertically as well as in side. At least a part of the prisms (7, 8) for erecting the image in side are axially displaced so that they are located at the side of, above or below the light amplifier tube (2) depending on the orientation of the microscope. This means that the entire instrument is shorter and the center of gravity is moved forwards. The telescope objectives (9, 10) and oculars (11, 12) are also so designed that the exit pupil has a diameter of at least 7 millimeters, preferably 7–12 millimeters, which means that no rotatable prism houses for adjusting the eyes distance are required so that the instrument is more simple and easy to handle.

9 Claims, 2 Drawing Figures

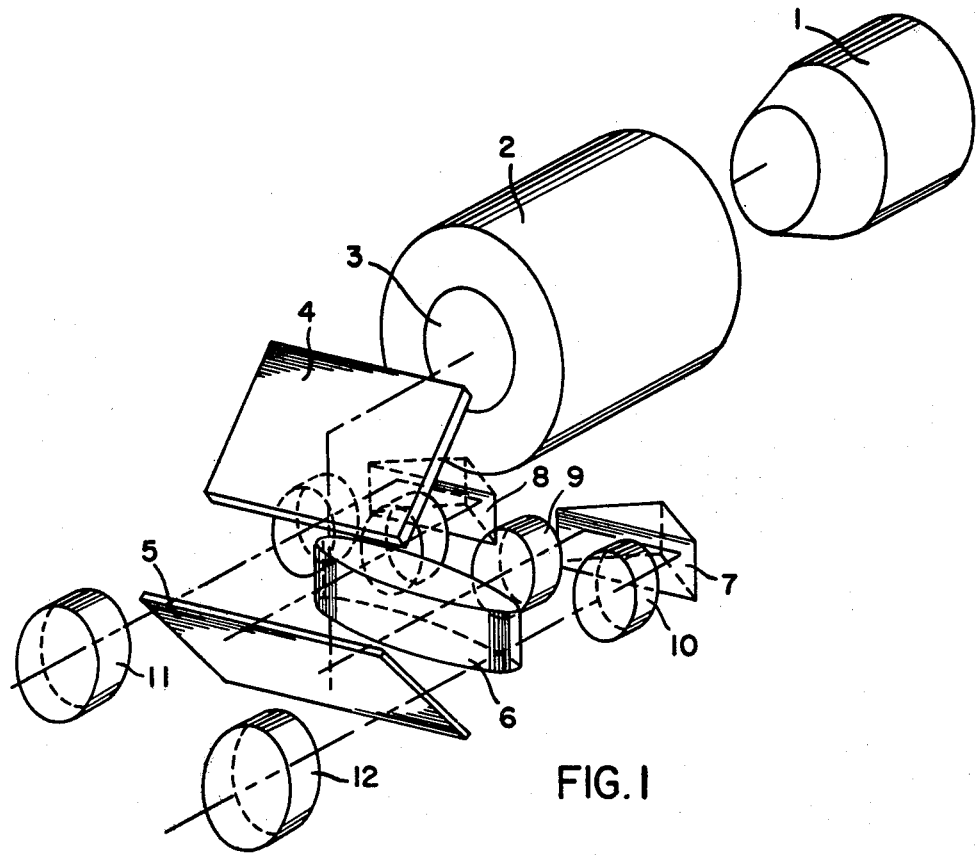
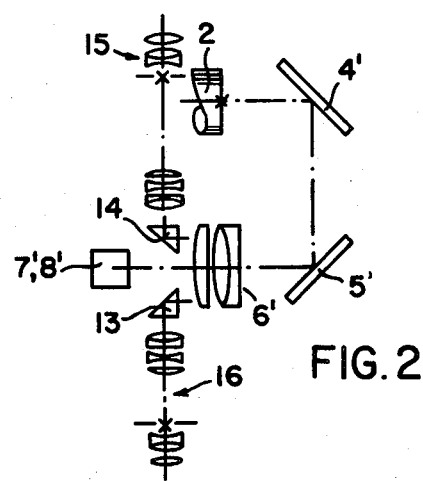

BINOCULAR NIGHT TELESCOPE

The present invention relates to a binocular night telescope of the type which comprises a large aperture objective, a light amplifier tube for amplifying the image projected by said large aperture objective and a viewing microscope comprising telescope objectives and oculars as well as a collimating objective to focus the amplified image at infinity for an observer.

For the observation of military targets it is common to use binocular instruments. A binocular telescope makes it easier to detect small or hidden targets and it also makes it less tiring for the eyes of the observer. For use at night such a telescope is provided with a light amplifier tube for amplifying the image of the target which is projected by the large aperture objective to permit observation of the screen of the tube with both eyes, it is previously known to use special magnifying glasses. Such magnifying glasses, however, are often big and complicated and they also give insufficient magnification.

In order to increase the magnification it is then previously known to use binocular for observation of the screen of the tube in which microscopes the distance between the eyes can be adjusted by turning two prism houses, each of the houses then including a rombic prism and provided with an ocular. The microscope also comprises two objectives, which together with said oculars form a binocular telescope, and a collimating objective, for focusing the image—in this case the screen of the light amplifier tube—at infinity, when observed through the binocular telescope. The microscope further comprises two optical prism systems for erecting the image. Such a microscope, however, is bulky and not tight and the center of gravity will be located too far to the back of the instrument. It is also difficult to keep the bearings of the rotatable ocular prisms tight. Furthermore in the darkness it is also difficult to read the scale indicating the distance of the eyes and the operating time tends to be too long.

According to the present invention said problems have been solved in such a way that the image erecting optical prisms or mirrors of the viewing microscope have been axially displaced so that at least a part of them are located on the same side as the light amplifier tube with respect to an imaginary plane through the screen and perpendicular to the axis of the tube. This means that the entire instrument is shorter than previous instruments and the centre of gravity is moved forwards.

According to a preferred embodiment of the invention the telescope objectives and the oculars of the viewing microscope are so designed that the exit pupil has a diameter of at least seven millimeters, preferably 7–12 millimeters. Such an exit pupil size means that the instrument is suitable for all kinds of eye distances without any need for adjusting the distance between the oculars in the microscope. No rombic prisms for adjusting the eyes distance are required.

DESCRIPTION OF THE FIGURES

FIG. 1 schematically illustrates one embodiment of a telescope according to the invention, and FIG. 2 another embodiment with additional observation channels.

DESCRIPTION OF THE PREFERRED EMBODIMENT

The instrument shown in FIG. 1 comprises a very large aperture objective lens 1 which is focusing an image of the object, for instance a military target, on the photo cathode of a light amplifier tube 2. The image is amplified in a known way in the amplifier tube and appears on the screen 3 of the tube. Two mirrors 4 and 5 are located near the screen 3 and are erecting the image vertically. The screen 3 is focussed at infinity by means of a collimating objective 6. Optical prisms 7 and 8 for erecting the image in side, i.e. horizontally are axially displaced so that they are located on the same side as the tube of the light amplifier 2 with respect to an imaginary plane through the screen 3 and perpendicular to the axis of the tube, i.e. with the orientation of the instrument illustrated in FIG. 1 the prisms are located below the light amplifier tube 2. By means of the location of the prisms 7 and 8 the light rays are positioned and turned back at the side of the light amplifier tube. Due to the location of the prisms 7 and 8 the distance between the optical axes is also at the same time increased so that the collimating objective 6 and the mirrors 4 and 5 can be disposed between the optical axes. The telescope objectives 9 and 10 together with the collimating objective 6 are focusing the object on the image plane of oculars 11 and 12 respectively. The telescope objectives 9, 10 and the oculars 11 and 12 are then so designed that an exit pupil of the microscope of at least 7 millimeters, preferably 7–12 millimeters, is obtained. This means a large relative aperture, a focal ratio of at least 1.3.5, and the objective must be designed as a large aperture anastigmatic lens corrected for a large field of view (compared with a stero microscope) and a large relative aperture. Consequently the objective must consist of a plurality of individual lenses, some of them may be disposed between the collimating objective 6 and the prisms 7 and 8.

FIG. 2 shows another embodiment of the telescope in which the collimating objective 6' is round in contrast to the embodiment illustrated in FIG. 1, in which the collimating objective 6 is cut, which means that the area of the objective 6' which is otherwise not used can be used for further one or two observation channels, for instance channels for additional observers or for a camera. Otherwise the telescope comprises, like FIG. 1, a light amplifier tube 2' of which only a part (the back part with the screen) is illustrated in FIG. 2, mirrors 4' and 5' for erecting the image vertically and prisms 7' and 8' located at the side of the light amplifier tube 2 for erecting the image also in side. Between the prisms 7' and 8' further prisms 13,14 are located for distributing the light rays to the additional observation channels 15, 16.

We claim:
1. A binocular night telescope comprising:
   a large aperture objective lens for focussing an image on an image plane;
   a light amplifier having a light receiving surface in said image plane and providing an amplified image to a transmitting image screen end of said amplifier;
   a viewing microscope comprising: a collimating lens means for axially displacing said image, inverting said image about a first axis and focussing said image at infinity for an observer including first and second erecting means having at least a part located between the ends of said light amplifier for receiving said axially displaced image and inverting said image about an axis perpendicular to said first axis, thereby forming second and third images;

first and second telescope objective lens located for transmitting said second and third images away from said first and second erecting means along optical axes of said microscope; and first and second ocular lens for viewing images transmitting by said telescope lens.

2. A binocular night telescope according to claim 1, wherein said means for erecting the image comprises prisms or mirrors.

3. A binocular night telescope according to claim 2 wherein at least a part of said prisms or mirrors for erecting the image horizontally are located on the same side of the light amplifier with respect to an imaginary plane through the transmitting image screen end perpendicular to the axis of the tube.

4. A binocular night telescope according to claim 3 wherein the prisms or mirrors for erecting the image increase the distance between the two optical axes of the viewing microscope so that the collimating lens means for erecting the image vertically are located between said microscope optical axes.

5. A binocular night telescope according to claim 1, wherein said telescope objectives and oculars provide an exit pupil of the microscope with a diameter of at least 7 millimeters.

6. A binocular night telescope according to claim 5 wherein the exit pupil has a diameter of 7–12 millimeters.

7. A binocular night telescope according to claim 1, wherein said telescope objectives have a relatively large aperture having a focal ratio of at least 1:3.5.

8. A binocular night telescope according to claim 9, further comprising prisms for distributing the light rays to one or more additional optical axes for forming additional observation channels.

9. A binocular night telescope comprising:

a large aperture objective lens for focussing incident light on a receiving end of a light amplifier tube, said light amplifier tube providing an image at a screen located at one end thereof;

first and second mirrors located in front of said screen, said mirros reflecting said image back towards a plane of said screen along an axis displaced from said image tube axis;

collimating objective lens for focussing said reflected image at infinity;

first and second objective lens for focussing first and second images from said collimating lens on a plane;

first and second image erecting prisms located at least partially between ends of said light amplifier, for receiving said first and second images and erecting said images; and lens means including first and second ocular lens for viewing images erected by said prism, said ocular lens located in front of said screen and mirrors, said ocular lens spaced apart to permit binocular viewing of an image from said light amplifier image screen.

* * * * *